US008665998B2

(12) United States Patent
Kopmeiners et al.

(10) Patent No.: US 8,665,998 B2
(45) **Date of Patent: *Mar. 4, 2014**

(54) MAXIMUM LIKELIHOOD DETECTION METHOD USING A SEQUENCE ESTIMATION RECEIVER

(75) Inventors: Robert John Kopmeiners, Hengelo (NL); Didier Johannes Richard Van Nee, De Meern (NL)

(73) Assignee: Agere Systems LLC, Allentown, PA (US)

( * ) Notice: Subject to any disclaimer, the term of this patent is extended or adjusted under 35 U.S.C. 154(b) by 1276 days.

This patent is subject to a terminal disclaimer.

(21) Appl. No.: 11/946,152

(22) Filed: Nov. 28, 2007

(65) Prior Publication Data

US 2008/0069274 A1 Mar. 20, 2008

Related U.S. Application Data

(63) Continuation of application No. 10/047,064, filed on Jan. 15, 2002, now Pat. No. 7,319,725.

(30) Foreign Application Priority Data

Jan. 15, 2001 (EP) .................................... 01300298

(51) Int. Cl.
*H04L 27/06* (2006.01)

(52) U.S. Cl.
USPC ........... 375/341; 375/150; 375/322; 375/324; 375/329

(58) Field of Classification Search
USPC .................. 375/150, 152, 322, 324, 329, 341
See application file for complete search history.

(56) References Cited

U.S. PATENT DOCUMENTS

| | | | | |
|---|---|---|---|---|
| 5,276,706 | A | 1/1994 | Critchlow | 375/343 |
| 5,303,263 | A | 4/1994 | Shoji et al. | 375/229 |
| 5,371,471 | A * | 12/1994 | Chennakeshu et al. | 329/304 |
| 5,537,443 | A | 7/1996 | Yoshino et al. | 375/340 |
| 5,623,511 | A | 4/1997 | Bar-David et al. | 375/143 |
| 6,026,121 | A * | 2/2000 | Sadjadpour | 375/262 |
| 6,154,443 | A | 11/2000 | Huang et al. | 370/210 |
| 6,246,732 | B1 | 6/2001 | Kobayashi et al. | 375/346 |
| 6,396,878 | B1 | 5/2002 | Piirainen | 375/262 |
| 6,452,964 | B1 | 9/2002 | Yoshida | 375/222 |

(Continued)

FOREIGN PATENT DOCUMENTS

| | | | |
|---|---|---|---|
| EP | 0715421 | 6/1996 | |
| WO | WO 99/49586 | 9/1999 | H04B 7/00 |

OTHER PUBLICATIONS

Hou et al.,"Complementary Filter Design for Testing of IS-95 Code Division Multiple Access Wireless Communication Systems", IEEE, US, vol. Conf. 49, 1999, pp. 722-726.

*Primary Examiner* — Chieh M Fan
*Assistant Examiner* — Freshteh N Aghdam
(74) *Attorney, Agent, or Firm* — Ryan, Mason & Lewis, LLP

(57) ABSTRACT

The invention relates to a detection method using a receiver of a digital communication system for the detection of a symbol from a received signal, which signal is transmitted by a transmitter of the digital communication system, wherein the symbol is a selected symbol out of a predetermined set of symbols and wherein each symbol of the predetermined set comprises a sequence of chips wherein each of the chips is PSK-modulated according to a selected modulation code.

15 Claims, 2 Drawing Sheets

2
20
ESTIMATION BLOCK 16
CORRELATION BLOCK 10.1
CORRELATION BLOCK 10.2
CORRELATION BLOCK 10.M
FEEDBACK BLOCK 14
DECISION BLOCK 12
18
22.1
22.2
22.M
4
6
15

(56) References Cited

U.S. PATENT DOCUMENTS 6,614,836 B1 9/2003 Halford et al. ................ 375/152
6,731,698 B1 5/2004 Yoshie .......................... 375/327
6,763,059 B2 7/2004 Suzuki et al. ................. 375/148
6,997,910 B2 2/2006 Howlett et al. ............... 604/191
2002/0010896 A1 1/2002 Huttunen ...................... 714/796
2004/0101032 A1 5/2004 Dabak et al. .................. 375/143

* cited by examiner 24
4
6
26
MATCHED FILTER
27
+
-
36
28
CORRELATOR-BANK
29
+
-
30
CORRELATION BLOCK
31
32
DECISION BLOCK
34
FEEDBACK BLOCK

MAXIMUM LIKELIHOOD DETECTION METHOD USING A SEQUENCE ESTIMATION RECEIVER

CROSS-REFERENCE TO RELATED APPLICATION

This application is a continuation of U.S. application Ser. No. 10/047,064 filed Jan. 15, 2002 now U.S. Pat. No. 7,319, 725, which claims priority of European Patent Application No. 01300298.5 filed Jan. 15, 2001, each incorporated by reference herein

BACKGROUND OF THE INVENTION

The invention relates to a detection method using a receiver of a digital communication system for the detection of a symbol from a received signal, which signal is transmitted by a transmitter of the digital communication system, wherein the symbol is a selected symbol out of a predetermined set of symbols and wherein each symbol of the predetermined set comprises a sequence of chips wherein each of the chips is PSK-modulated according to a selected modulation code.

Detection methods of this kind are known and find their applications in a variety of digital data communication systems. These data communication systems can for instance be wireless data communication systems. According to known methods, the receiver of the data communication system detects a symbol by detecting successively the chips of the symbol This is referred to as chip-by-chip detection. After the detection of each chip, a correction signal for the Inter Chip Interference (ICI-effect) between neighbouring chips is generated and subtracted from the received signal A first disadvantage of known methods is that detecting on a chip-by-chip basis gives rise to some loss of coding gain with respect to detecting an entire symbol at one go (this is detecting on symbol-by-symbol basis). A second disadvantage of known methods is that no use is made of the a priori knowledge of the predetermined set.

SUMMARY OF THE INVENTION

It is an object of the invention to provide a detection method which yields an optimal coding gain by detecting an entire symbol at one go. It is also an object of the invention to provide a detection method which uses a priory knowledge of the predetermined set. For this, the detection method of the invention is characterised in that a set of reference symbols is generated on the basis of the predetermined set of symbols and the channel impulse response between the transmitter and the receiver, wherein each of the successive parts of the received signal, each part having the length of a symbol, is compared with each of the reference symbols, yielding a detected symbol for each part of the received signal. This detection method yields an optimal coding gain since complete symbols are detected at one go. Furthermore, a priory knowledge of the predetermined is used by only comparing the received signal with reference symbols corresponding to symbols from the predetermined set. The latter approach also saves processing power with respect to a detection method wherein all possible combinations of chips are compared with the received signal. A further advantage of the method according to the invention is that the ICI-effect is maximally suppressed. This is caused by the fact that the ICI-effect has been taken into account implicitly in the generation of reference symbols. These reference symbols are created by convolving the symbols out of the predetermined set with the channel impulse response between the transmitter and the receiver A preferred embodiment of the method according to the invention is characterised in that a correction signal is generated on the basis of the detected symbol convolved with the channel impulse response, wherein the correction signal is subtracted from the part of the received signal which succeeds the part of the received signal corresponding to the detected symbol for suppressing the ISI-effect. The ISI-effect may occur (in an analogous way as the ICI-effect) as a consequence of TDS In the detection method of the invention, each time a part of the received signal with the length of a symbol is corrected for the ISI-effect as soon as a symbol from the preceding part with the length of a symbol of the received signal is detected. The correction signal may be an estimated coefficient multiplied with the detected symbol convolved with the channel impulse response A further embodiment of the method according to the invention is characterised in that the comparison between each of the parts of the received signal with each of the reference symbols is performed by a correlator yielding a correlation value, wherein the correlation value is corrected with half the energy of the reference symbol.

An alternative embodiment of the detection method of the invention is characterised in that the received signal is filtered by a filter which yields a filter signal, wherein the filter is a matched filter to the channel impulse response between the transmitter and the receivers wherein each of the successive parts of the filter signal, each part having the length of a symbol, is compared with each of the symbols from the predetermined set of symbols yielding a detected symbol for each part of the filter signal. In this embodiment, the received signal is in a first step corrected for the channel impulse response between transmitter and receiver.

A further embodiment of the alternative detection method according to the invention is characterised in that a correction signal is generated on the basis of the detected symbol, wherein the collection signal is subtracted from the part of the filter signal which succeeds the part of the filter signal corresponding to the detected symbol for suppressing the ISI-effect.

A still further embodiment of the alternative detection method according to the invention is characterised in that the comparison, between each of the parts of the filter signal with each of the reference symbols, is performed by a correlator yielding a correlation value, wherein the correlation value is corrected with half the energy of the reference symbol

BRIEF DESCRIPTION OF THE DRAWINGS

In the accompanying drawings, in which certain modes of carrying out the present invention are schematically shown for illustrative purposes.

DETAILED DESCRIPTION

Figure 1:
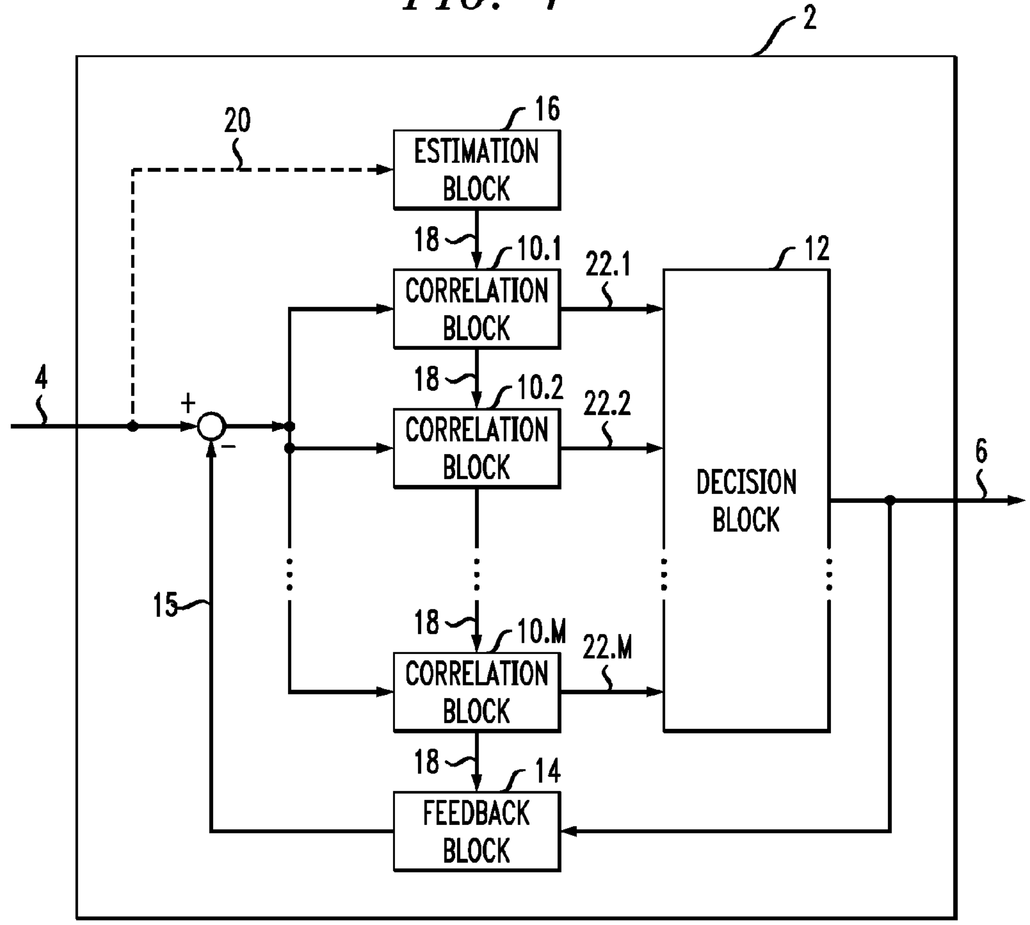
FIG. 1 is a diagram schematically showing a receiver for performing a detection method according to the invention.
Figure 2:
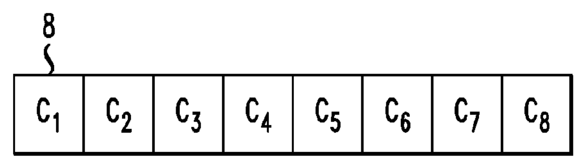
FIG. 2 presents a symbol comprising eight chips, wherein each chip is Phase Shift Keying Modulated.

A receiver 2 of a digital communication system for receiving a signal 4 and performing a detection, according to a detection method of the invention, of a symbol from the received signal 4 is shown in FIG. 1 The signal 4 is transmitted by a transmitter of the digital communication system to the receiver 2. The output 6 of the receiver 2 is the detected symbol from the received signal 4. The detected symbol is a selected symbol out of a predetermined set of symbols. Each symbol of the predetermined set comprises a sequence of chips wherein each of the chips is PSK-modulated according to a selected modulation code An example of a symbol 8 of the predetermined set comprising eight chips $C_1$ up to and including $C_8$ is shown in FIG. 2.

The receiver 2 comprises a set of correlation blocks 10.1 up to and including 10 M for performing correlations between the received signal 4 and reference symbols from a set of reference symbols, a decision block 12 for selecting one of said reference symbols, a feedback block 14 for generating a correction signal 15 for suppressing the Inter Symbol Interference effect (ISI-effect) and an estimation block 16 for generating an estimation 18 of the channel impulse response between the transmitter and the receiver on the basis of a reference signal 20

In a first step of the detection method of the receiver 2, the received signal 4 is correlated with symbols from a set of reference symbols. These correlations are performed by a set of M correlation blocks 10.*m* (m=1, . . . , M). In this example, the $m^{th}$ correlation block correlates the received signal 4 with the $m^{th}$ reference symbol $S_m$ from the set of M reference symbols. The correlations are performed between successive parts of the received signal 4 wherein each part has the length of a symbol. This yields M correlation values 22.*m* (m=1, . . . , M) per part of the received signal Each of the correlation values may be corrected with half the energy of the corresponding reference symbol in order to make the correlation values mutually comparable Next, these correlation values are the input to the decision block 12 which selects the reference symbol corresponding to the largest correlation value. The detected symbol is the symbol from the predetermined set of symbols which corresponds with the selected reference symbol for the part of the received signal. The detected symbol is the output 6 of the receiver 2

Time Delay Spread (TDS) is the effect wherein a received signal, which has been transmitted by a transmitter, has spread out in time with respect to the signal before transmission This results in that a part of the signal may end up in another part of the received signal. The TDS-effect may occur as a result of multi-path in the channel between transmitter and receiver. The Inter Chip Interference (ICI-effect) is the result of the TDS-effect wherein a chip smears out over a neighbouring chip. The Inter Symbol Interference (ISI-effect) is the result of the IDS-effect wherein a symbol smears out over a neighbouring symbol The receiver 2, performing a detection method according to the invention, effectively suppresses the ICI-effect since entire symbols are detected at one go by comparing entire symbols with reference symbols (this is called detection on a symbol-by-symbol basis). Since the reference symbols are convoluted with the channel impulse response, the ICI-effect is automatically accounted for For the suppression of the ISI-effect in the detection method performed by the receiver 2, a feedback loop is used comprising the feedback block 14. The feedback block 14 calculates a correction signal 15 for the received signal 4. This correction signal 15 is a function of the detected symbol. This function may be an estimated coefficient multiplied with the detected symbol convolved with the channel impulse response between the transmitter and the receiver. The correction signal 15 is subtracted from the part of the received signal which succeeds the part of the received signal corresponding to the detected symbol The M reference symbols $S_m$ (m=1, . . . , M) are obtained by convoluting the symbols from the predetermined set with the channel impulse response between the transmitter and the receiver. This implicates that the symbols from the set of reference symbols have to be re-calculated regularly and at least every time the channel impulse response has changed. The estimation 18 of the channel impulse response is performed by the estimation block 16 on the basis of the reference signal 20. The estimation 18 is fed to the correlation blocks 10 m (m=1, . . . , M). Then, the $m^{th}$ correlation block calculates the reference symbol $S_m$ (m=1, . . . , M) which is used for correlations to be performed by the $m^{th}$ correlator.

Figure 3:
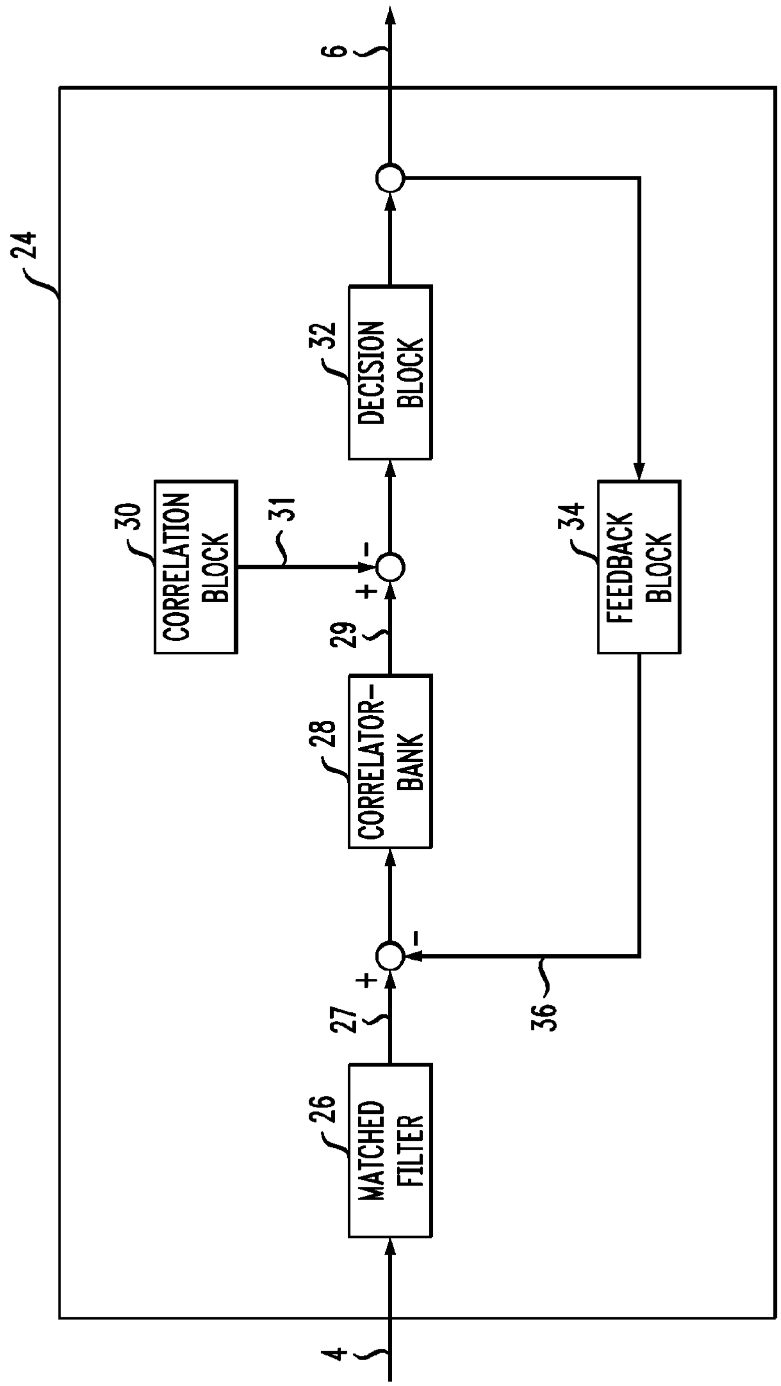
FIG. 3 is a diagram schematically showing an alternative receiver for performing a detection method according to the invention

An alternative receiver 24 of a digital communication system for receiving a signal 4 and performing a detection method according to the invention of a symbol from the received signal 4 is shown in FIG. 3. The signal 4 is transmitted by a transmitter of the digital communication system to the receiver 24. The output 6 of the receiver 2 is the detected symbol from the received signal 4. The receiver 24 comprises a matched filter 26 on the channel between the transmitter and the receiver, a correlator-bank 28 comprising a set of correlators, a correction block 30 for generating correction terms 31 for the output of the correlator-bank 28, a decision block 32 for selecting a detected symbol from the predetermined set of symbols and a feedback-block 34 for generating a correction signal 36 for suppressing the ISI-effect The first step in the receiver 24 is the filtering of the received signal 4 by the channel matched filter block 26, resulting in the filter signal 27. The filter signal 27 is fed to a correlator-bank 28 comprising M correlator's, wherein successive parts of the filter signal 27 are correlated with each of the M symbols from the predetermined set of symbols. This yields an output 29 of the correlator-bank 28 of M correlation values per part of the filter signal 27 The $m^{th}$ correlation value results from the correlation between the part of the filter signal 27 and the $m^{th}$ symbol from the predetermined set of symbols. Each of the correlation values is corrected by the correction block 30 with a correction value 31 in order to generate correlation values which are mutually comparable. In this example, the correction value is half the energy of the corresponding symbol. The decision block 32 selects the symbol from the predetermined set of symbols which corresponds to the largest correlation value; this selected symbol is the detected symbol 6. Since the detection of the symbol is performed on a symbol-by-symbol basis, the ICI-effect is effectively suppressed (in an analogous way as described hereinbefore in relation to receiver 2). The suppression of the ISI-effect is suppressed with a feedback loop wherein the feedback block 34 generates a correction signal 36 on the basis of the detected symbol 6 (in an analogous way as described hereinbefore in relation to receiver 2).

It will be clear to those skilled in the art that the invention can be practised otherwise than as specifically illustrated and described without departing from its spirit of scope. For example amplitude modulation can be used in combination with PSK-modulation.

What is claimed:

1. A detection method using a receiver of a digital communication system for the detection of a symbol from a received signal, which signal is transmitted by a transmitter of the digital communication system, wherein the symbol is a selected symbol out of a predetermined set of symbols and wherein each symbol of the predetermined set comprises a sequence of chips wherein each of the chips is phase-shift keying PSK-modulated according to a selected modulation code, wherein the method comprises:

generating a set of reference symbols on the basis of the predetermined set of symbols and a channel impulse response between the transmitter and the receiver; and comparing each of the successive parts of the received signal, each part having the length of a symbol, with each of the reference symbols, yielding a detected symbol for each part of the received signal.

2. The method according to claim 1, wherein the comparison between each of the parts of the received signal with each of the reference symbols is performed by a correlator yielding a correlation value, wherein the correlation value is corrected with half the energy of the reference symbol.

3. The method according to claim 1, wherein the set of reference symbols is generated by convolving one or more symbols of the predetermined set with the channel impulse response.

4. The method according to claim 1, wherein the set of reference symbols is generated to account for an Inter Chip Interference effect.

5. The method according to claim 1, wherein the set of reference symbols is regenerated if said channel impulse response substantially changes.

6. A detection method using a receiver of a digital communication system for the detection of a symbol from a received signal, which signal is transmitted by a transmitter of the digital communication system, wherein the symbol is a selected symbol out of a predetermined set of symbols and wherein each symbol of the predetermined set comprises a sequence of chips wherein each of the chips is phase-shift keying PSK-modulated according to a selected modulation code, wherein the method comprises:

filtering the received signal with a filter which yields a filter signal, wherein the filter is a matched filter to the channel impulse response between the transmitter and the receiver; and comparing each of the successive parts of the filter signal, each part having the length of a symbol, with each of the symbols from the predetermined set of symbols yielding a detected symbol for each part of the filter signal.

7. The method according to claim 6, wherein the comparison, between each of the parts of the filter signal with each of the predetermined symbols, is performed by a correlator yielding a correlation value, wherein the correlation value is corrected with half the energy of the reference symbol.

8. The method according to claim 6, wherein the set of predetermined symbols is generated by convolving one or more symbols of the predetermined set with the channel impulse response.

9. The method according to claim 6, wherein the set of predetermined symbols is generated to account for an Inter Chip Interference effect.

10. The method according to claim 6, wherein the set of predetermined symbols is regenerated if said channel impulse response substantially changes.

11. A digital communication system receiver for detecting a symbol from a received signal, which signal is transmitted by a transmitter of the digital communication system, wherein the symbol is a selected symbol out of a predetermined set of symbols and wherein each symbol of the predetermined set comprises a sequence of chips wherein each of the chips is phase-shift keying PSK-modulated according to a selected modulation code, wherein the digital communication system receiver comprises:

a generator for generating a set of reference symbols on the basis of the predetermined set of symbols and a channel impulse response between the transmitter and the receiver; and a comparator for comparing each of the successive parts of the received signal, each part having the length of a symbol, with each of the reference symbols, yielding a detected symbol for each part of the received signal.

12. The digital communication system receiver according to claim 11, wherein the comparison between each of the parts of the received signal with each of the reference symbols is performed by a correlator yielding a correlation value, wherein the correlation value is corrected with half the energy of the reference symbol.

13. The digital communication system receiver according to claim 11, wherein the set of reference symbols is generated by convolving one or more symbols of the predetermined set with the channel impulse response.

14. The digital communication system receiver according to claim 11, wherein the set of reference symbols is generated to account for an Inter Chip Interference effect.

15. The digital communication system receiver according to claim 11, wherein the set of reference symbols is regenerated if said channel impulse response substantially changes.

* * * * *